United States Patent Office 3,023,215
Patented Feb. 27, 1962

3,023,215
METHOD OF PRODUCING SULFONIC DERIVATIVES OF N-SUBSTITUTED DITHIOCARBAMIC ESTERS
Wolfgang Gündel, Dusseldorf-Oberkassel, Germany, assignor to Dehydag, Deutsche Hydrierwerke G.m.b.H., Dusseldorf, Germany, a corporation of Germany
No Drawing. Filed Apr. 11, 1955, Ser. No. 500,677
Claims priority, application Germany Apr. 24, 1954
3 Claims. (Cl. 260—293.4)

This invention relates to sulfonic derivatives of N-substituted dithiocarbamic esters, and to methods of making the same from N-substituted dithiocarbamates and halogenated sulfonates.

It is well known that water-soluble sulfonic derivatives of N-substituted dithiocarbamic acid esters and water-soluble salts of such derivatives are highly effective brightening additives in metal electroplating baths.

These sulfonic acid derivatives can be represented by the general structural formula

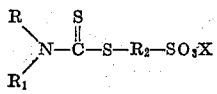

wherein R, $R_1$ and $R_2$ are acylic or cylic hydrocarbon radicals, but preferably aliphatic radicals, and X is a hydrogen atom, an alkali metal atom or an inorganic or organic basic radical. R, $R_1$ and $R_2$ may also have substituents attached thereto which contain oxygen atoms, sulfur atoms, nitrogen atoms or hetero-atom groups. Similarly, R and $R_1$ may, together with the nitrogen atom, be members of a heterocyclic ring system. In the appended claims the

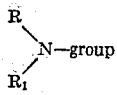

and its variations are designated by the symbol Z.

Heretofore, such sulfonic derivatives have been produced by reacting N-substituted dithiocarbamic acids with internal anhydrides of oxyalkane-sulfonic acids, commonly referred to as sultones. While this reaction proceeds very smoothly and produces very attractive yields, it is more or less limited in its application, since only 1,3- oxyalkane-sulfonic acids and 1,4-oxyalkane-sulfonic acids are capable of forming internal anhydrides. In other words, the known reaction is limited to the production of sulfonic derivatives of N-substituted dithiocarbamic alkyl esters, particularly to those alkyl esters in which the radical $R_2$ is an aliphatic radical having 3 or 4 carbon atoms in the aliphatic chain. Sulfonic derivatives of N-substituted dithiocarbamic esters in which the radical $R_2$ is a cyclic or heterocyclic radical cannot be produced at all by this method.

One of the objects of the present invention is to provide a method for the production of sulfonic acid derivatives of N-substituted alkyl-dithiocarbamates having the above general structural formula, wherein the radical $R_2$ is an aliphatic radical containing any desired number of carbon atoms, or a cyclic or heterocyclic radical.

Other objects and advantages of the present invention will become apparent as this description thereof proceeds.

I have found that by reacting N-substituted dithiocarbamates having the strucural formula

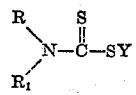

wherein R and $R_1$ represent the above-described radicals and Y represents an alkali metal atom, or a monovalent inorganic or organic basic atom group, with a halogen sulfonate having the general structural formula

wherein Q is a halogen atom, $R_2$ is a radical as above defined, i.e. a bivalent acyclic or cyclic radical, and X is a hydrogen atom or an alkali metal atom, or a monovalent inorganic or organic basic atom group, identical to or different from Y, sulfonic acid derivatives of N-substituted dithiocarbamic esters are formed which have the general structural formula

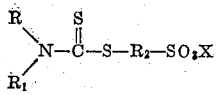

wherein R, $R_1$, $R_2$ and X represent radicals as above indicated.

The reaction may be represented schematically as follows:

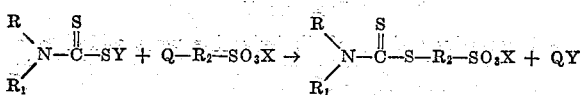

Despite the fact that the dithiocarbamates are relatively unstable and that the halogen atom in the halogen sulfonate has a relatively low reactivity, I have found that the condensation reaction in accordance with the present invention proceeds to substantial completion very smoothly, particularly if the sulfonate reactant is a bromoalkanesulfonate. The yields of N-substituted dithiocarbamic ester sulfonates are very good and only a negligible amount of undesirable side-products is formed.

Examples of dithiocarbamates which may successfully be reacted with halogen sulfonates in accordance with my invention are the following:

N,N-dimethyl-sodiumdithiocarbamate
N,N-diethyl-potassiumdithiocarbamate
N,N-diisopropyl-sodiumdithiocarbamate
N,N-dibutyl-dibutylamine-dithiocarbamate
Piperidyl-N-sodiumdithiocarbamate
Morpholyl-N-sodiumdithiocarbamate
Piperazine-N,N'-bis-sodiumdithiocarbamate and the like.

Examples of halogen sulfonates which may be employed as the other reactant in the above condensation reaction are the following:

Bromomethane-sulfonates
2-bromoethane-1-sulfonates
3-bromopropane-1-sulfonates
2-bromopropane-1-sulfonates
4-bromobutane-1-sulfonates
6-bromohexane-1-sulfonates
4-chloromethylbenzene-1-sulfonates and the like.

The reaction is preferably carried out by heating the reactants in the presence of each other to a temperature between 80° C. and 100° C. for extended periods of time. The best results are obtained when the reactants are heated in the presence of a solvent such as water, an alcohol, or mixtures of water and an alcohol.

In many instances, particularly when it is desired to produce N-substituted dithiocarbamic alkyl sulfonates, I have found it to be advantageous to react the dithiocarbamates and the halogenated alkyl sulfonates of the same basic compound. In other words, in such cases it is preferred that Y and X represent identical basic radicals. Examples of suitable alkaline radicals are ammonium, sodium, potassium, magnesium, calcium, barium, strontium, lead, silver, and the like, as well as organic alkaline radicals, such as dimethylamine, trimethylamine, and the like.

The following examples will further illustrate my invention and enable others skilled in the art to understand the invention more completely. It is understood, however, that these examples are given only for purposes of illustration and that my invention is not limited thereto.

*Example I*

26.4 parts by weight of N,N-pentamethylene-pyridine dithiocarbamate, produced from piperidine, carbondisulfide and pyridine, and 24.1 parts by weight of 3-bromopropane-1-potassium sulfonate were dissolved in 200 parts by weight of water. The resulting solution was then heated on a boiling water bath for 16 hours. Thereafter, the reaction mixture was neutralized by the addition of a few drops of dilute sulfuric acid, filtered in the presence of activated charcoal, and evaporated to dryness. The residue was recrystallized from alcohol. The crystalline product was found to be analytically pure N,N-pentamethylene-dithiocarbamic-n-propylester-ω-potassium sulfonate. It was colorless and odorless and formed a clear aqueous solution.

*Example II*

8.0 parts by weight of diethylamine were added to a suspension of 8.4 parts by weight of carbondisulfide in 100 parts by volume of water, accompanied by vigorous stirring. Thereafter, 220 parts by volume of 0.5 N sodium hydroxide were added to the cloudy suspension, also accompanied by vigorous stirring, whereby all of the carbondisulfide was caused to enter into reaction with the diethylamine to form N,N-diethyl-sodiumdithiocarbamate. 21.1 parts by weight of crystalline bromoethane-sodium sulfonate were added to the carbamate solution, and the resulting reaction mixture was heated at about 100° C. for 8 hours. Thereafter, the reaction mass was neutralized with a few drops of dilute sulfuric acid and then evaporated to dryness. The residue was dissolved in alcohol at elevated temperatures to remove inorganic impurities. Upon cooling the alcohol solution, colorless needles crystallized out which were analyzed to be N,N-diethyl-dithiocarbamic ester-ω-sodium sulfonate. The crystalline product formed a clear aqueous solution.

While I have given examples of certain specific embodiments of my invention, I wish it to be understood that various changes and modifications may be made therein without departing from the spirit of the invention or the scope of the appended claims.

I claim:

1. The method of producing a compound having the general structural formula

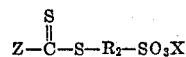

wherein Z represents an organic radical containing at least one nitrogen atom selected from the group consisting of alkyl, cycloalkyl and heterocyclic radicals, wherein said hetero atoms are selected from the group consisting of nitrogen and oxygen atoms, said radicals being linked to the carbon atom through said one nitrogen atom, $R_2$ represents a radical selected from the group consisting of lower aliphatic, benzyl and cyclohexyl radicals, and X is selected from the group consisting of hydrogen, alkali and alkaline metal atoms, ammonium radicals and organic alkaline radicals, which comprises subjecting a compound having the general structural formula

wherein Z represents a radical as above defined and Y is selected from the group consisting of alkali and alkaline metal atoms, ammonium radicals and organic alkaline radicals, to a condensation reaction with a compound having the general structural formula $$Q—R_2—SO_3X$$

wherein Q represents a halogen atom and $R_2$ and X represent radicals as above defined.

2. The method of producing a compound having the general structural formula

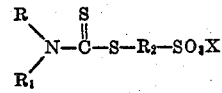

wherein R and $R_1$ form a pentamethylene radical, $R_2$ is a n-propyl radical and X is an alkali metal atom, which comprises subjecting a compound having the general formula

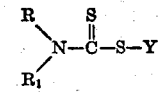

wherein R and $R_1$ are radicals as above defined and Y is a pyridine radical, to a condensation reaction at a temperature of about 100° C. and in the presence of water as a solvent, with a compound having the general structural formula $$Q—R_2—SO_3X$$

wherein Q is a bromine atom and $R_2$ and X are radicals as above defined.

3. The method of producing a compound having the general structural formula

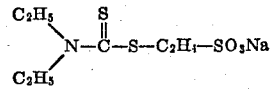

which comprises subjecting N,N-diethyl-sodiumdithiocarbamate to a condensation reaction with bromoethane-sodiumsulfonate at a temperature of about 100° C., and in the presence of water as a solvent.

References Cited in the file of this patent

UNITED STATES PATENTS

| | | |
|---|---|---|
| 2,067,494 | Lichty | Jan. 12, 1937 |
| 2,127,375 | Bousquet | Aug. 16, 1938 |